United States Patent [19]

Shields

[11] 4,425,298

[45] Jan. 10, 1984

[54] BAFFLE MAINTENANCE APPARATUS

[75] Inventor: Edward P. Shields, North Huntingdon, Pa.

[73] Assignee: Westinghouse Electric Corp., Pittsburgh, Pa.

[21] Appl. No.: 252,116

[22] Filed: Apr. 8, 1981

[51] Int. Cl.³ .............................................. G21C 17/00
[52] U.S. Cl. ................................................... 376/249
[58] Field of Search ............... 376/249, 251; 33/168 R, 33/147 K, 147 L, 147 N, 178 F

[56] References Cited

U.S. PATENT DOCUMENTS

| | | | |
|---|---|---|---|
| 2,498,171 | 2/1950 | Michler | 33/168 R |
| 2,792,634 | 5/1957 | Howe et al. | 33/168 R |
| 4,036,686 | 7/1977 | Weilbacher et al. | 376/251 |
| 4,131,018 | 12/1978 | Muller et al. | 376/249 |
| 4,196,049 | 4/1980 | Burns et al. | 376/249 |
| 4,311,556 | 1/1982 | Iwamoto et al. | 376/249 |

FOREIGN PATENT DOCUMENTS 2830306 1/1980 Fed. Rep. of Germany ...... 376/249

Primary Examiner—Sal Cangialosi
Attorney, Agent, or Firm—L. A. DePaul

[57] ABSTRACT

The baffle inspection apparatus comprises a gauging mechanism mounted on a movable support for determining the width of a gap between two adjacent baffle plates in a nuclear reactor. The gauging mechanism comprises a rotatable member with a plurality of feeler gauges disposed thereon that is capable of remotely rotating and laterally aligning each feeler gauge with the selected gap to determine the size of the gap. The apparatus may be equipped with underwater camera and lights for remotely viewing the inspection operation.

8 Claims, 32 Drawing Figures

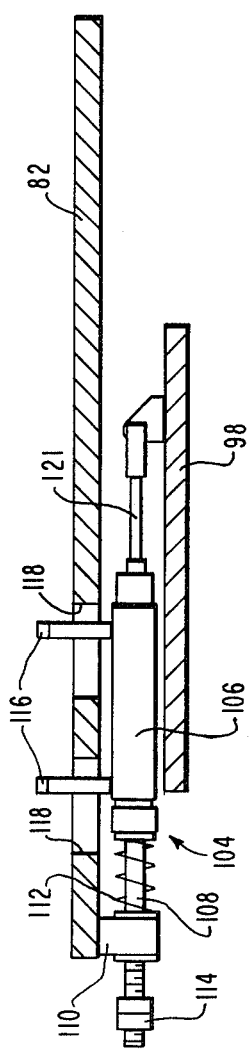
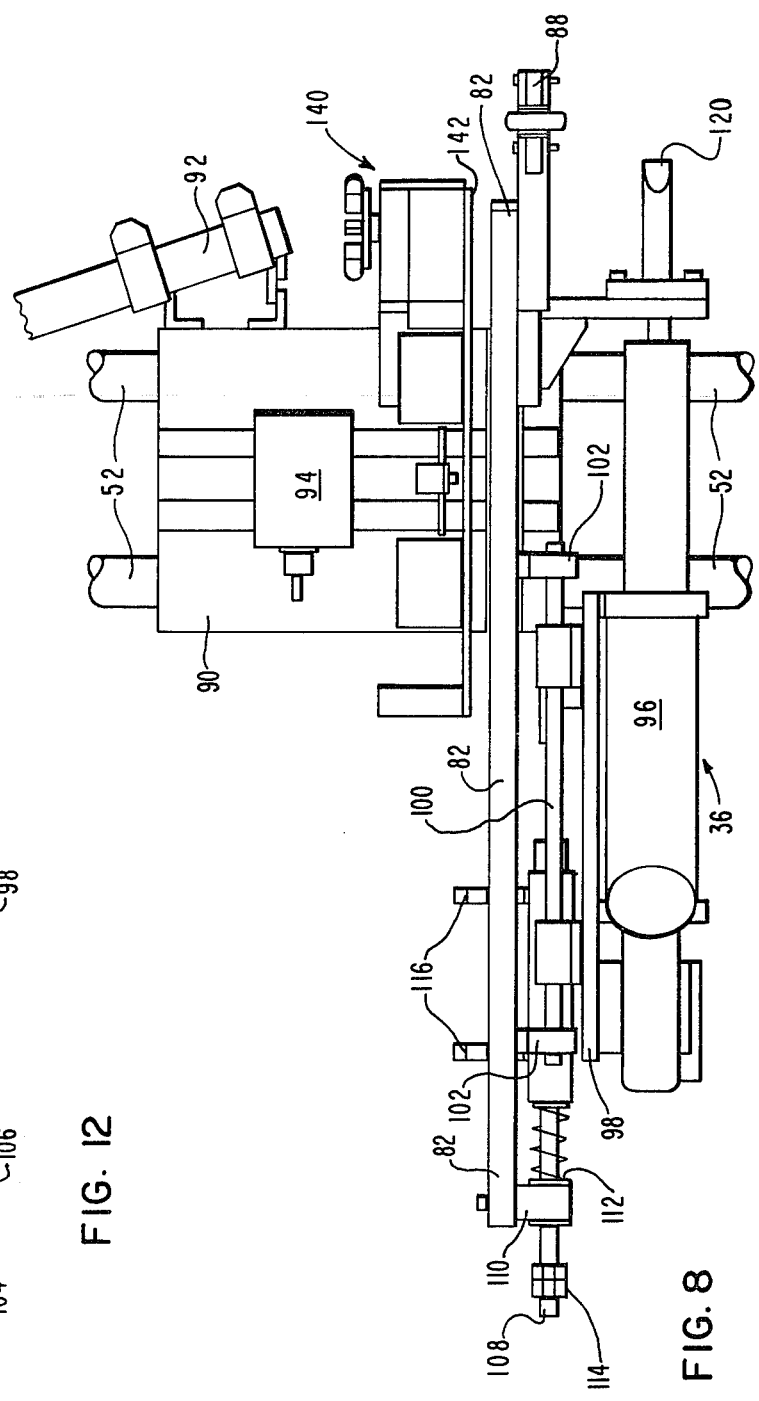
FIG. 12
FIG. 8

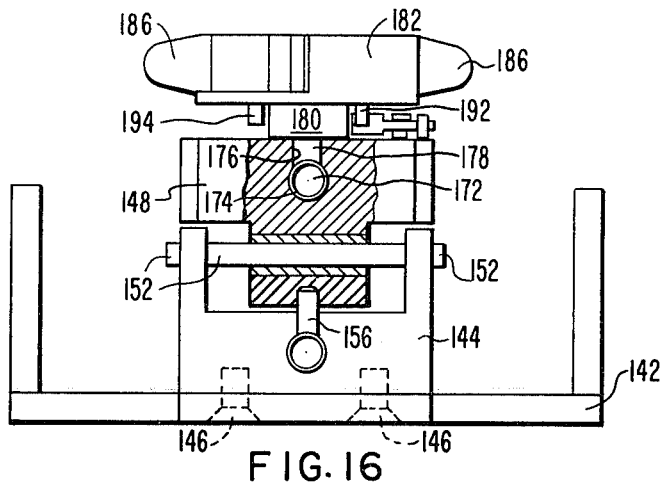
FIG. 16
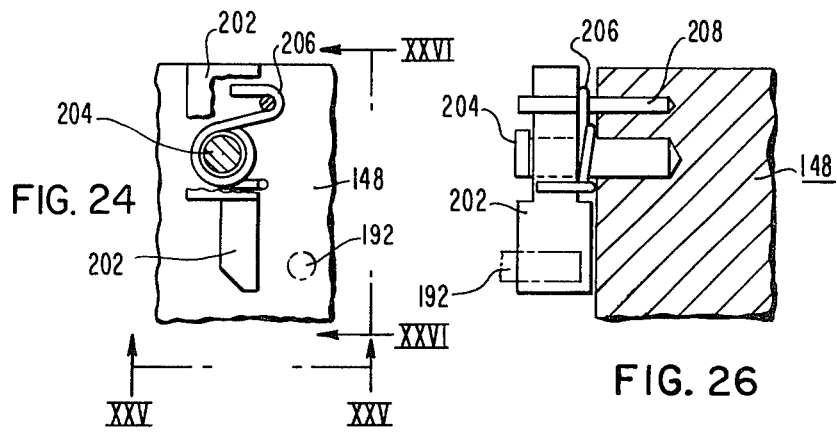
FIG. 24
FIG. 26
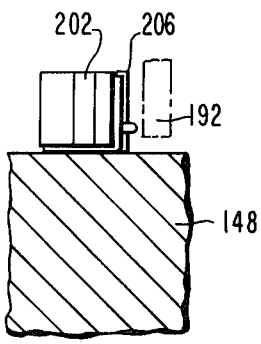
FIG. 25

BAFFLE MAINTENANCE APPARATUS

BACKGROUND OF THE INVENTION

This invention relates to nuclear reactor maintenance apparatus and more particularly to nuclear reactor inspection apparatus for remotely determining spacing between two members.

Conventional pressurized water reactors comprise a reactor vessel with a reactive core disposed therein which produces heat in a manner well understood in the art. A water coolant is circulated through the reactor vessel and in heat transfer relationship with the core so that heat is transferred from the core to the water coolant. The reactive core generally comprises a plurality of fuel assemblies comprising nuclear fuel. The fuel assemblies are surrounded by a plurality of vertical metal baffle plates that define the outer limits of the core. Although the baffle plates are joined together to form an outer perimeter for the core, the individual baffle plates are not welded together. Since the baffle plates are not welded together, small gaps may exist between two adjacent baffle plates. Because the baffle plates serve to direct the flow of reactor coolant water through the reactor core, the small gaps between the baffle plates do not detract from the performance of this function. However, since a substantial pressure differential may exist across the baffle plates, it is possible for small streams of high velocity reactor coolant to be established through the gaps between these baffle plates. These streams of reactor coolant can cause vibrations in the fuel assemblies or otherwise damage the fuel assemblies. Therefore, what is needed is apparatus for determining the size of the gap between each baffle plate so that those gaps that are too large may be reduced.

SUMMARY OF THE INVENTION

The baffle maintenance apparatus comprises a gauging mechanism mounted on a movable support for determining the width of a gap between two adjacent baffle plates in a nuclear reactor. The gauging mechanism comprises a rotatable member with a plurality of feeler gauges disposed thereon that is capable of remotely rotating and laterally aligning each feeler gauge with the selected gap to determine the size of the gap. The apparatus may be equipped with underwater camera and lights for remotely viewing the inspection operation.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

FIG. 8 is a side view of the peening apparatus;

FIG. 12 is a side view of the peening drive means;

FIG. 16 is a view along line XVI—XVI of FIG. 15;

FIG. 24 is a top view of the spring loaded stop;

FIG. 25 is a view along line XXV—XXV of FIG. 24;

FIG. 26 is a view along line XXVI—XXVI of FIG. 25;

DESCRIPTION OF THE PREFERRED EMBODIMENT

Since the vertical baffle plates in pressurized water reactor cores are not welded together, gaps may exist between the plates that may allow jetting of the reactor coolant water through the gaps. In order to determine if such gaps exist after a period of reactor operation and in order to determine if corrective procedures are required, it is first necessary to measure the gaps between the plates. The invention described herein provides apparatus for remotely measuring gaps between plates in a nuclear reactor for determining if such gaps need to be reduced.

Figure 1:
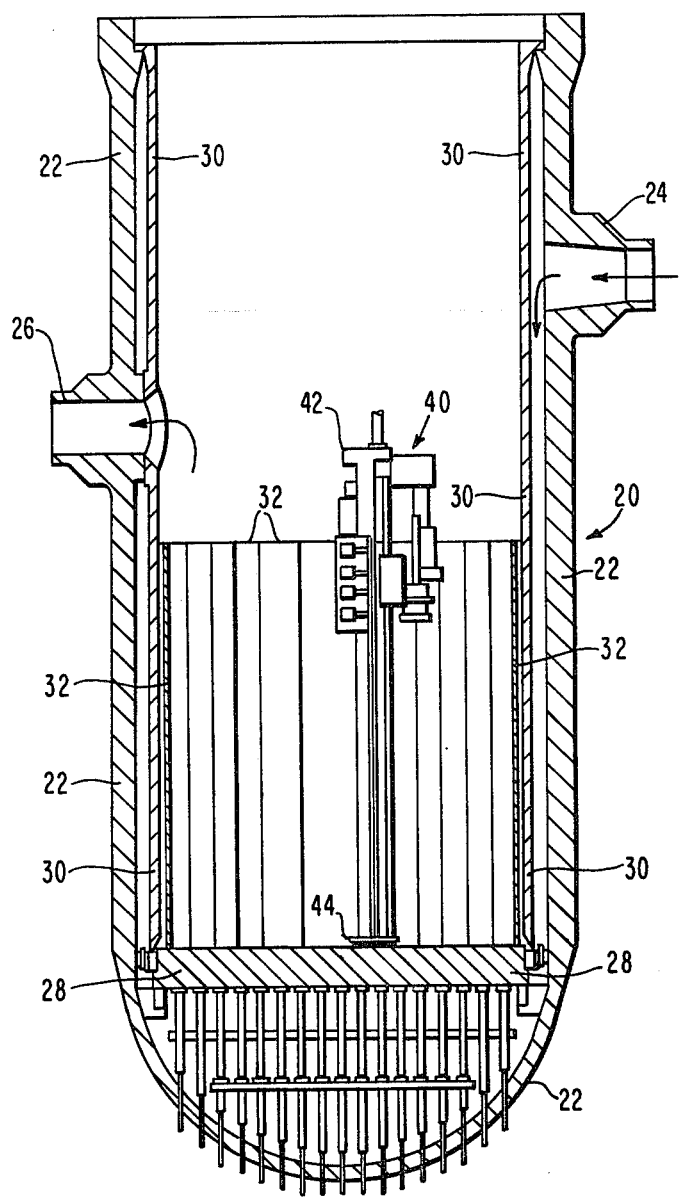
FIG. 1 is a partial cross-sectional view in elevation of a pressurized water reactor.
Figure 2:
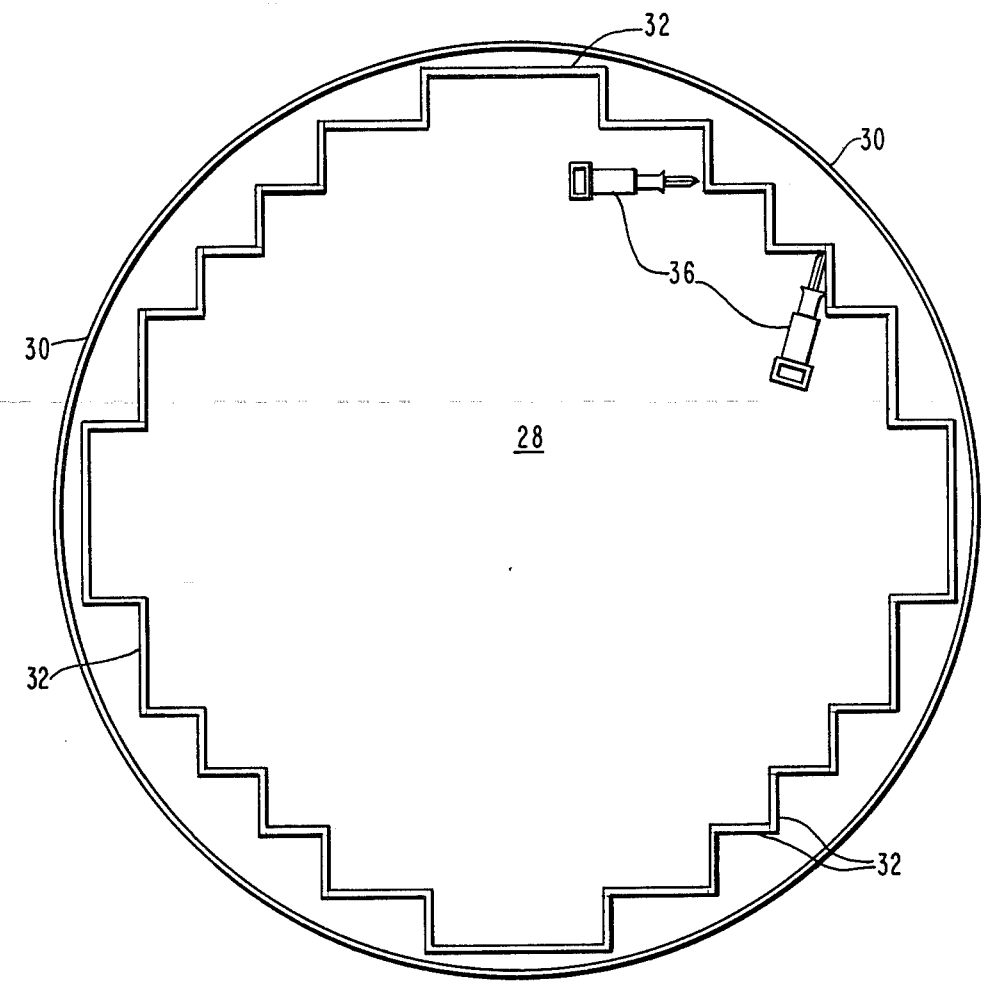
FIG. 2 is a partial top view of the reactor.

Referring to FIG. 1, a pressurized water nuclear reactor is referred to generally as 20 and comprises a reactor vessel 22 having an inlet 24 and an outlet 26. A core plate 28 is suspended in the lower portion of reactor vessel 22 and serves to support fuel assemblies (not shown) when reactor 20 is operating. A generally cylindrical core barrel 30 is disposed in reactor vessel 22 for directing the flow of reactor coolant which may be water from inlet 24 down the annulus between reactor vessel 22 and core barrel 30 and into the lower end of reactor vessel 22. From the lower end of reactor vessel 22, the reactor coolant flows upwardly through holes in core plate 28, through the core area of the reactor, and out through outlet 26. In this manner, the reactor coolant passes in heat transfer relationship to the fuel assemblies which are normally disposed on core plate 28.

Figure 3:
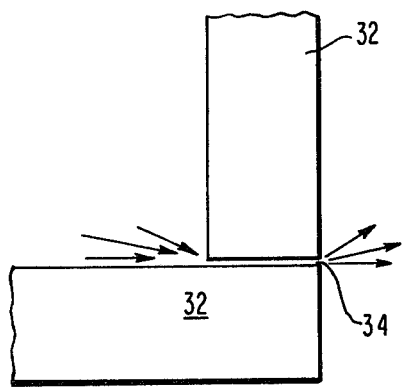
FIG. 3 is an enlarged view of the gap between two adjacent baffle plates.
Figure 4:
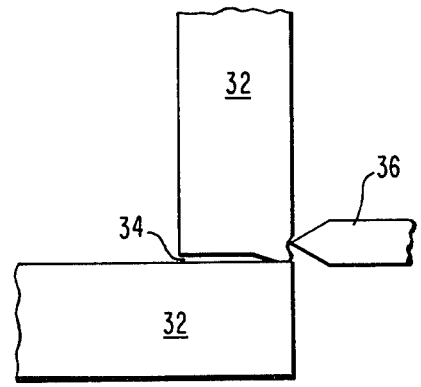
FIG. 4 is an enlarged view of a reduced gap between two adjacent baffle plates.

Referring now to FIGS. 1–4, a plurality of vertical baffle plates 32 are disposed within core barrel 30 and on core plate 28 and define the outer perimeter of the reactor core in a conventional manner. While baffle plates 32 are connected together to form a rigid structure, they are not welded together along their lengths. Since baffle plates 32 are not welded or otherwise sealed along their lengths, gaps 34 may exist between adjoining baffle plates 32. However, when gaps 34 exceed approximately 0.0015 inches, it is generally advisable to reduce the width of the gap in order to prevent jetting of water therethrough as shown in FIG. 3. The jetting of water through gaps 34 can cause vibrations or lead to damage of the fuel assemblies in the core. One means of reducing gap 34 is by the use of peening apparatus 36 which can be used to hammer the edge of one of the baffle plates 32 so as to deform that baffle plate 32 near the end thereof as shown in FIG. 4. By slightly deforming the end of baffle plate 32 along its length, the adjoining baffle plates can be made to touch or otherwise reduce gap 34 therebetween. In this fashion, gap 34 can be reduced or eliminated thereby reducing or eliminating the jetting of water through gaps 34.

However, before gaps 34 are attempted to be closed, it is first necessary to determine if a gap 34 exists between two selected baffle plates 32 and the size of the gap. Once the gap is determined to be of such a size that it would be advisable to close, then peening apparatus 36 may be employed to reduce the gap.

Figure 5:
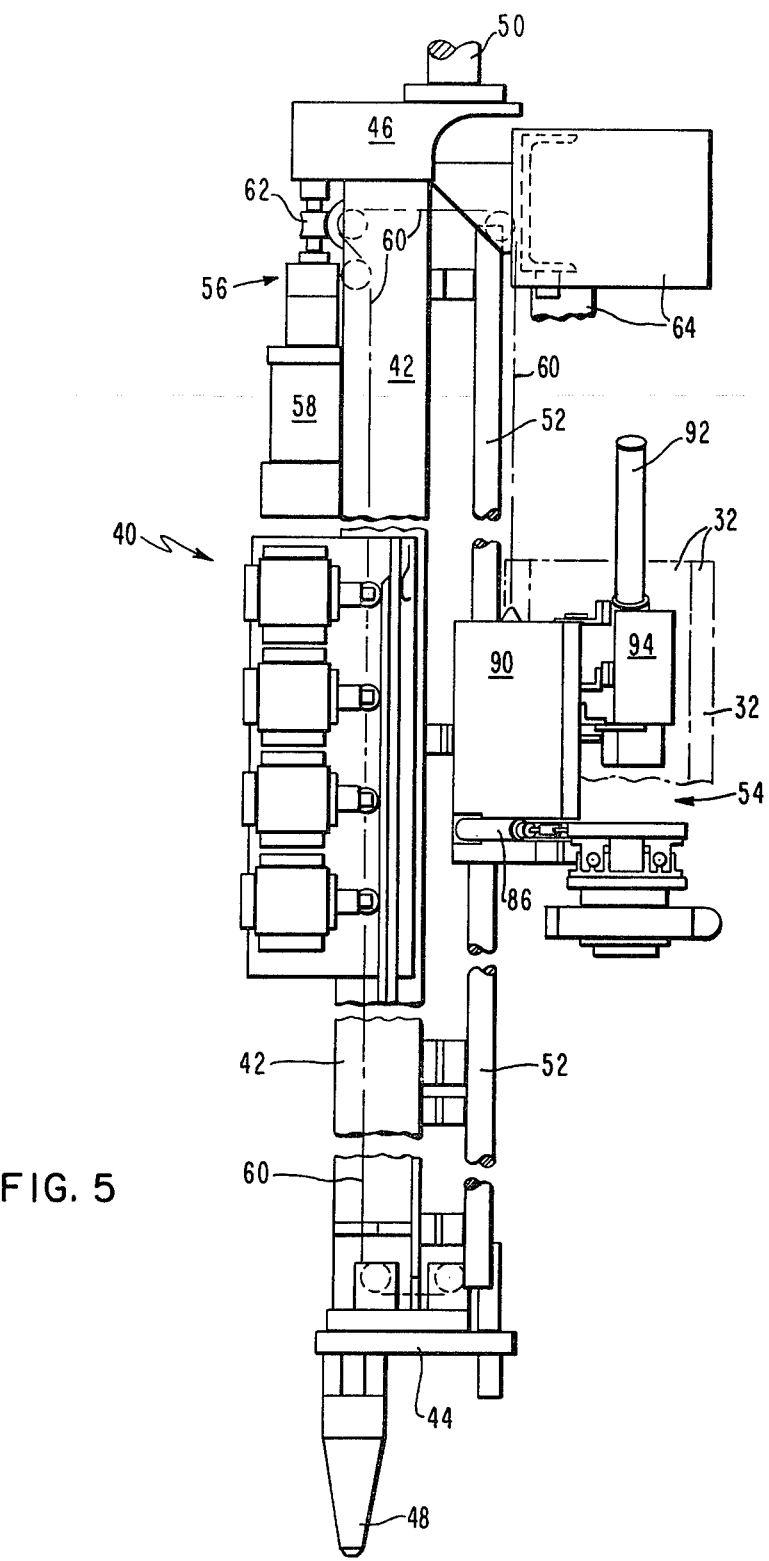
FIG. 5 is a partial view in elevation of the baffle maintenance apparatus.

Referring now to FIGS. 1 and 5, the baffle maintenance apparatus is referred to generally as 40 and comprises a vertical support member 42 with a bottom plate 44 attached thereto at its lower end and a top plate 46 attached thereto at its upper end. Vertical support member 42 may be a stainless steel metal member approximately 14 feet in length and capable of extending from core plate 28 to above the top of baffle plates 32 for supporting equipment to perform operations on baffle plates 32. A plurality of pins 48 are attached to the bottom of bottom plate 44 and are capable of being disposed in flow holes of core plate 28 for aligning and stabilizing vertical support member 42. In addition, an extension member 50 may be attached to top plate 46 for positioning baffle maintenance apparatus 40 on core plate 28. A plurality of vertical rods 52 are also attached to top plate 46 and bottom plate 44 and are arranged parallel to vertical support member 42 for supporting and guiding carriage 54 along rods 52. Carriage 54 is slidably mounted on rods 52 and attached to drive means 56 for selectively moving carriage 54 along rods 52. Drive means 56 comprises a hydraulic motor 58 of approximately 2,000 in-lb torque that is mounted on vertical support member 42 and connected to chain drive mechanism 60 by means of gears 62. Chain drive mechanism 60 is also connected to carriage 54 for moving carriage 54 vertically along rods 52 under the influence of motor 58. In this manner, carriage 54 can be moved along the entire length of baffle plates 32 for performing maintenance operations thereon.

Figure 6:
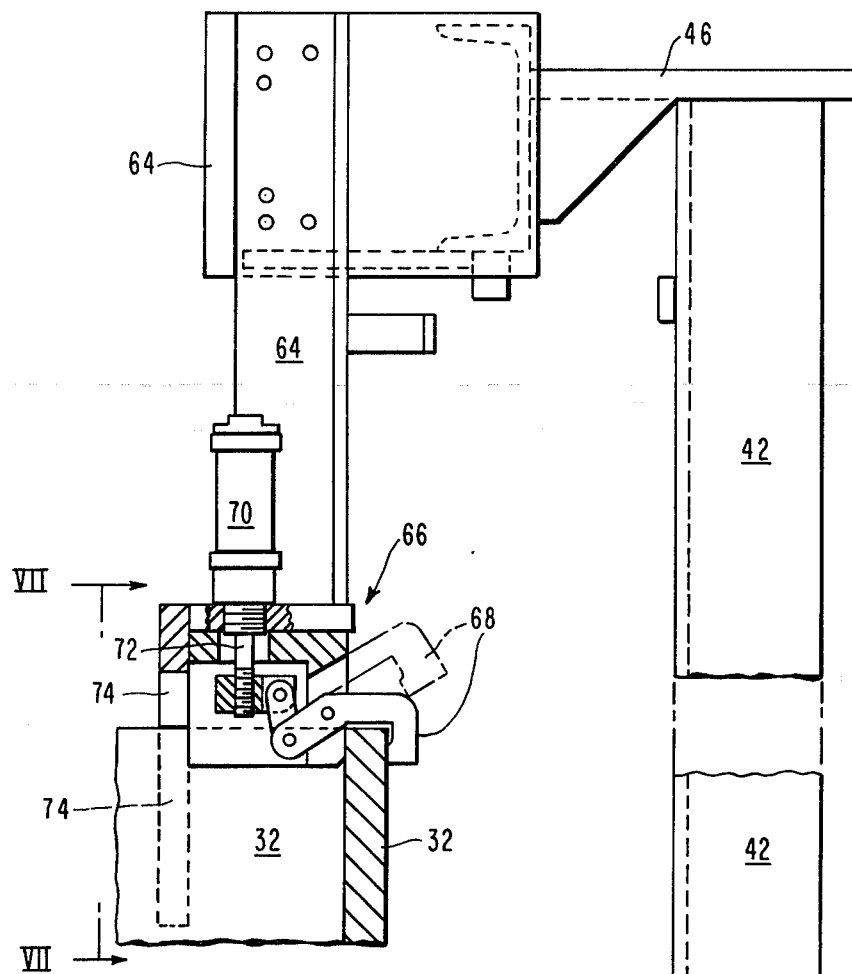
FIG. 6 is a view of the gripper mechanism.
Figure 7:
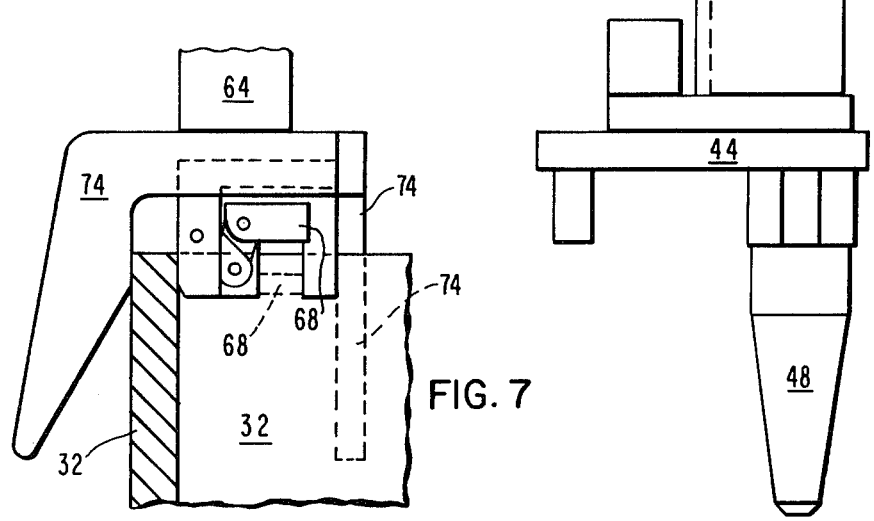
FIG. 7 is a view along line VII—VII of FIG. 6.

Referring to FIGS. 5, 6 and 7, a gripper support assembly 64 is attached to top plate 46 and extends vertically substantially parallel to vertical support member 42 for supporting gripper mechanism 66. Gripper mechanism 66 comprises a mechanical latch 68 pivotally connected to hydraulic cylinder 70 which may be a 2-inch stroke Bimba hydraulic cylinder model number H-092-DUZ. When piston 72 of hydraulic cylinder 70 is moved upwardly latch 68 is caused to grip the top end of baffle plate 32 thereby providing an attachment for baffle maintenance apparatus 40 at the top of baffle plate 32. Similarly, when hydraulic cylinder 70 causes piston 72 to move downwardly, latch 68 is disengaged from baffle plate 32 as shown in phantom in FIG. 6. Gripper support assembly 64 also comprises a plurality of guide members 74 attached to gripper support assembly 64 and arranged to slide over the top of baffle plate 32 for guiding gripper mechanism 66 into proper alignment with baffle plate 32 and for providing additional stability for baffle maintenance apparatus 40. In general, two guide members 74 are provided with each gripper mechanism 66 and with each guide member 74 arranged at right angles to each other for contacting each of the two adjacent baffle plates 32. Thus, it can be seen that baffle maintenance apparatus 40 may be lowered onto core plate 28 with pins 48 disposed in core plate 28 and with gripper mechanism 66 capable of gripping the top of baffle plate 32 thereby positioning carriage 54 in proper relationship to baffle plates 32 for performing maintenance thereon.

Referring now to FIGS. 8-11, carriage 54 comprises a mounting member 80 that is slidably disposed on rods 52 and a carriage plate 82 pivotally attached to mounting member 80 by means of pivot pin 84. The attachment of carriage plate 82 to mounting member 80 by means of pivot pin 84 allows carriage plate 82 to pivot in a horizontal plane as shown in phantom in FIG. 11. This pivoting of carriage plate 82 provides a means by which carriage plate 82 can be moved along rods 52 without interfering with baffle plates 32 but allowing carriage plate 82 to be pivoted into a position for performing operations on gaps 34 between baffle plates 32. As can be seen in the drawings, carriage plate 82 is provided with at least two attachment points for pivot pin 84 so that carriage plate 82 can be reversed to perform operations on the opposite baffle plate. A second hydraulic cylinder 86 which may be similar to hydraulic cylinder 70 is attached to carriage plate 82 and to mounting member 80 for selectively pivoting carriage plate 82 with respect to mounting member 80. Carriage plate 82 may have a wheel 88 rotatably disposed thereon for contacting a side of a baffle plate 32 while allowing carriage 54 to move vertically with respect to baffle plate 32. In this manner, carriage plate 82 can be pivoted into contact with baffle plate 32 by means of hydraulic cylinder 86 and can be moved vertically along rods 52 while wheel 88 is in contact with baffle plate 32.

Still referring to FIGS. 8-11, a camera support 90 is mounted on mounting member 80 and provides a means to mount camera 92 and light source 94. Camera 92 which may be a Westinghouse Electric Corporation ETV 1250 and light source 94 which may be a 100-watt underwater light source are pivotably mounted on camera support 90 so that they can be manually directed toward the particular gap 34 on which operations are to be performed.

Referring now to FIGS. 8 and 12, peening apparatus 36 comprises an hydraulic hammer 96 which may be a Model CH18 Stanley chipping hammer and is attached to table 98. A pressure-compensated pump (not shown) rated at approximately 18 GPM and 3000 psi and powered by a 20 HP motor is connected to and drives hydraulic hammer 96. Table 98 is slidably attached to bar 100 with bar 100 being fixedly attached to carriage plate 82 by means of posts 102. Table 98 is also attached to peening drive means 104. Peening drive means 104 comprises an hydraulic cylinder 106 which may be similar to hydraulic cylinder 70 and is mounted on drive rod 108. Drive rod 108 is slidably disposed through stop 110 which is attached to carriage plate 82. A coil spring 112 is disposed around drive rod 108 and between stop 110 and hydraulic cylinder 106 for damping the reciprocal movements of hydraulic cylinder 106. Drive rod 108 threaded on the end of hydraulic cylinder 106 for adjusting the compression of coil spring 112. A plurality of nipples 116 are mounted on hydraulic cylinder 106 and extend through slots 118 in carriage plate 82 for providing attachment of hydraulic lines to hydraulic cylinder 106.

When hydraulic hammer 96 is activated, hammer chisel 120 reciprocates within hydraulic hammer 96 at a rate of approximately 2,000 times per minute. This causes hydraulic hammer 96 to vibrate at the same rate which causes table 98 to also vibrate. Since table 98 is attached to hydraulic cylinder 106 and to hydraulic hammer 96, the vibration of hydraulic hammer 96 is partially absorbed by coil spring 112. Thus the vibration caused by hydraulic hammer 96 can be dampened by coil spring 112. Hydraulic cylinder 106 also provides a means by which hydraulic hammer 96 maybe moved toward or away from baffle plates 32. By activating hydraulic cylinder 106, piston 121 can be moved into or out of hydraulic cylinder 106 thereby sliding table 98 and hydraulic hammer 96 horizontally relative to baffle plates 32.

Figure 13:
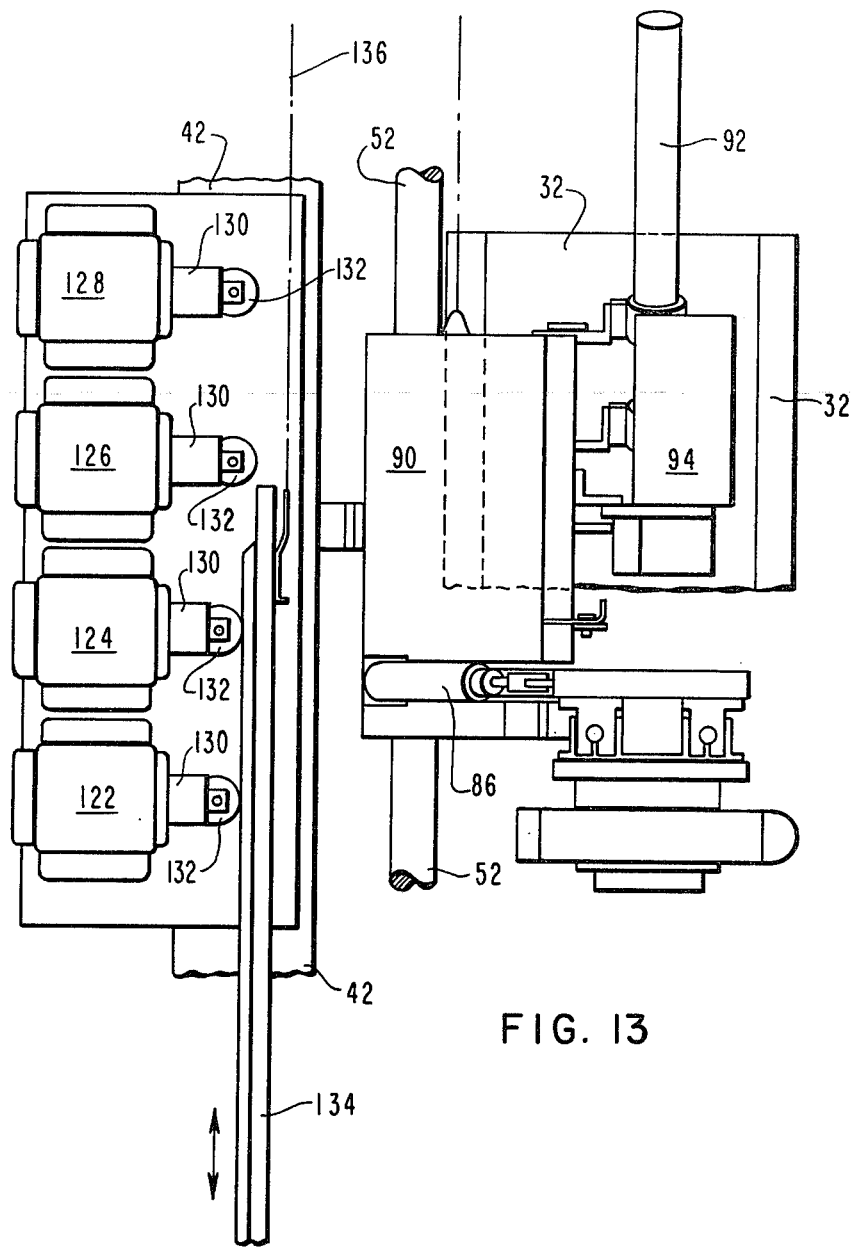
FIG. 13 is a partial cross-sectional view in elevation of the baffle maintenance apparatus.

Referring to FIG. 13, a plurality of hydraulic control valves 122, 124, 126 and 128 which may be Parker directional control valves model number D3W1-D-Y are mounted on an assembly and attached to vertical support member 42. Each control valve has a piston 130 with a wheel 132 on the end thereof for contacting actuator shaft 134. The movement of piston 130 into and out of the control valve opens or closes the valve thereby activating the equipment to which it is connected. Actuator shaft 134 is connected to drive cable 136 which is connected to a drive mechanism (not shown) that is located remote from the contol valves. As actuator shaft 134 is moved relative to the control valves, each wheel 132 contacts actuator shaft 134, sequentially, thereby moving piston 130 and operating the corresponding control valve. In this manner, the control valves can be opened or closed in sequence from a remote location. Control valve 122 is connected hydraulically to hydraulic cylinder 70 for activating gripper mechanism 66. Control valve 124 is connected hydraulically to hydraulic cylinder 86 for selectively pivoting carriage plate 82 with respect to mounting member 80. Control valve 126 is connected hydraulically to hydraulic hammer 96 for activating or deactivating hydraulic hammer 96. And, control valve 128 is connected hydraulically to hydraulic cylinder 106 for moving table 98 and hydraulic hammer 96 toward or away from baffle plates 32. In the non-operating position, actuator shaft 134 does not contact any wheels 132 of the control valves. However, as actuator shaft 134 is moved upwardly, actuator shaft 134 sequentially activates control valves 122, 124, 126 and 128 in succeeding order. Likewise, as actuator shaft 134 is moved downwardly, the control valves are deactivated in reverse order.

Figure 17:
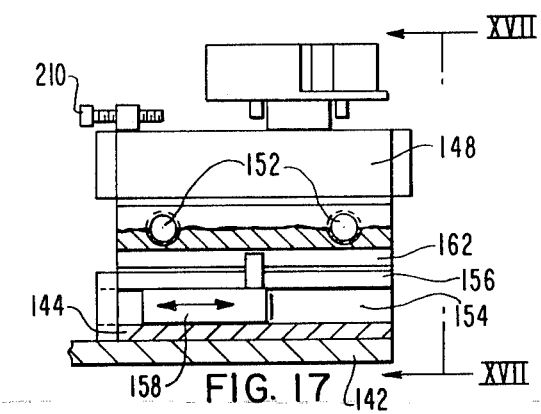
FIG. 17 is a partial cross-sectional view in elevation of the gauging mechanism.
Figure 18:
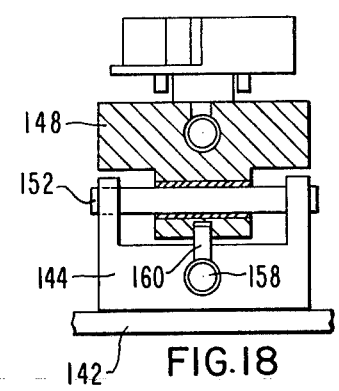
FIG. 18 is a view along line XVIII—XVIII of FIG. 17.
Figure 19:
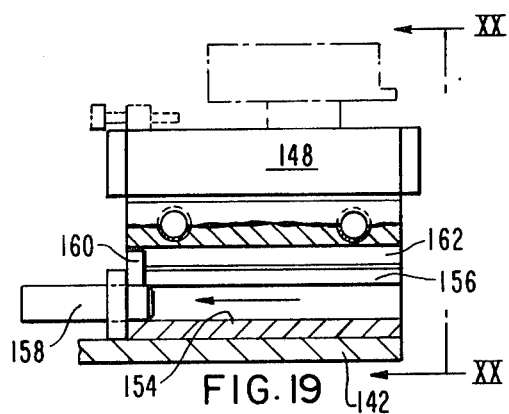
FIG. 19 is a partial cross-sectional view in elevation of the gauging mechanism.
Figure 20:
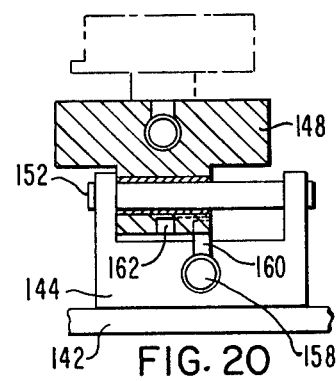
FIG. 20 is a view along line XX—XX of FIG. 19.
Figure 21:
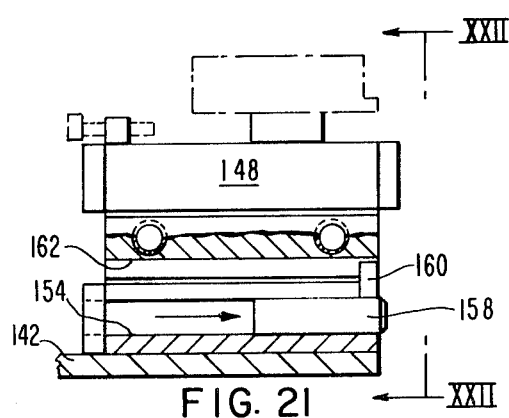
FIG. 21 is a partial cross-sectional view in elevation of the gauging mechanism.
Figure 22:
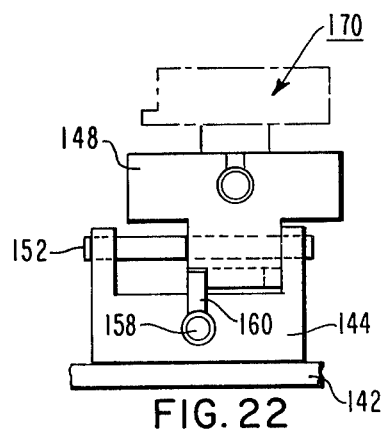
FIG. 22 is a view along line XXII—XXII of FIG. 21.
Figure 23:
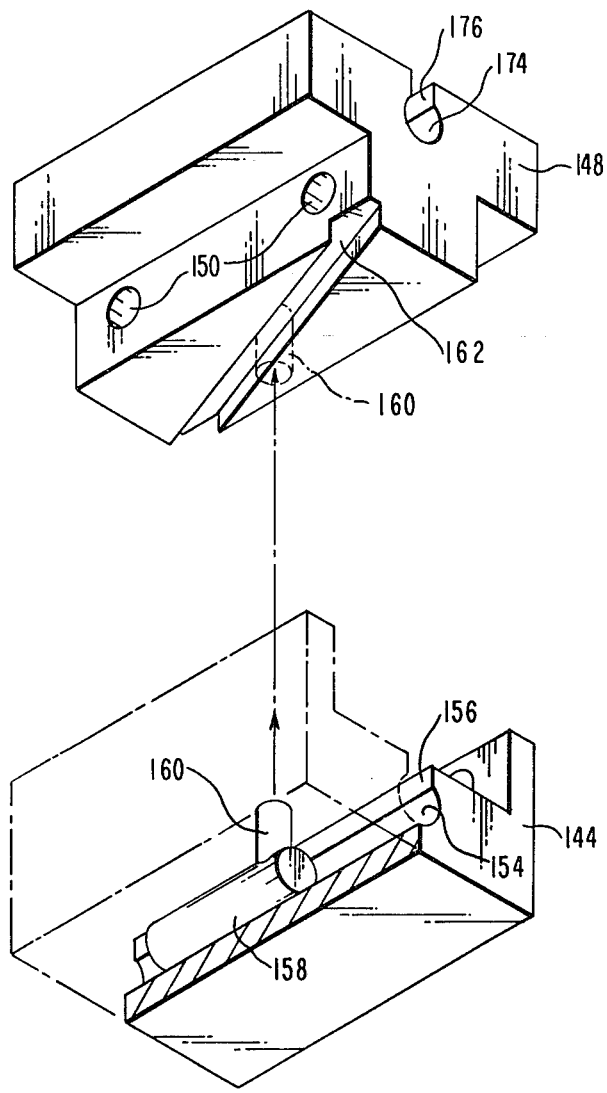
FIG. 23 is a partial exploded view of the gauging mechanism.

Referring now to FIGS. 8 and 14-23, a gauging mechanism 140 is attached to carriage plate 82. Gauging mechanism 140 is arranged on carriage 54 to be near baffle plates 32 for determining the width of gaps 34 between plates 32. Gauging mechanism 140 comprises a base 144 fixedly attached to plate 142 by means of screws 146 and a movable platform 148 slidably mounted on base 144. Platform 148 is formed in a "T" type configuration and has a plurality of holes 150 therein through which are disposed pins 152. Pins 152 are disposed through holes 150 and attached to base 144 in a manner to allow platform 148 to slide on pins 152 and laterally relative to base 144. Base 144 has a substantially cylindrical slot 154 therein that has a rectangular opening 156 along its top length. A cylindrical rod 158 is slidably disposed in slot 154 and has a post 160 attached thereto in a manner to extend through opening 156. Rod 158 is attached to a push-pull type cable (not shown) that leads to a location outside reactor vessel 22 so that rod 158 may be slid in slot 154 by pushing or pulling the cable. Platform 148 also has a diagonal groove 162 extending from one corner of platform 148 to the corner diagonally opposite therefrom. Post 160 extends into and is slidably disposed in groove 162 for sliding platform 148 on pins 152 and relative to base 144. When rod 158 is moved to a position as shown in FIG. 17, post 160 is located approximately midway along groove 162 and midway along slot 154. In such a position, platform 148 is centered on base 144 as shown in FIG. 18. When rod 158 is moved by the cable to a position as shown in FIG. 19, then post 160 is moved to an extreme end of slot 154 and groove 162 which causes platform 148 to slide on pins 152 into a configuration as shown in FIG. 20. Similarly, when rod 158 is pushed into a position as shown in FIG. 21, post 160 is moved to the other extreme end of slot 154 and groove 162 which causes platform 148 to be slid laterally on pins 152 and into a configuration as shown in FIG. 22. It can be seen that the movement of post 160 in groove 162 causes platform 148 to slide laterally with respect to base 144. In this manner the movement of rod 158 can result in the lateral movement of platform 148 relative to base 144.

Figure 14:
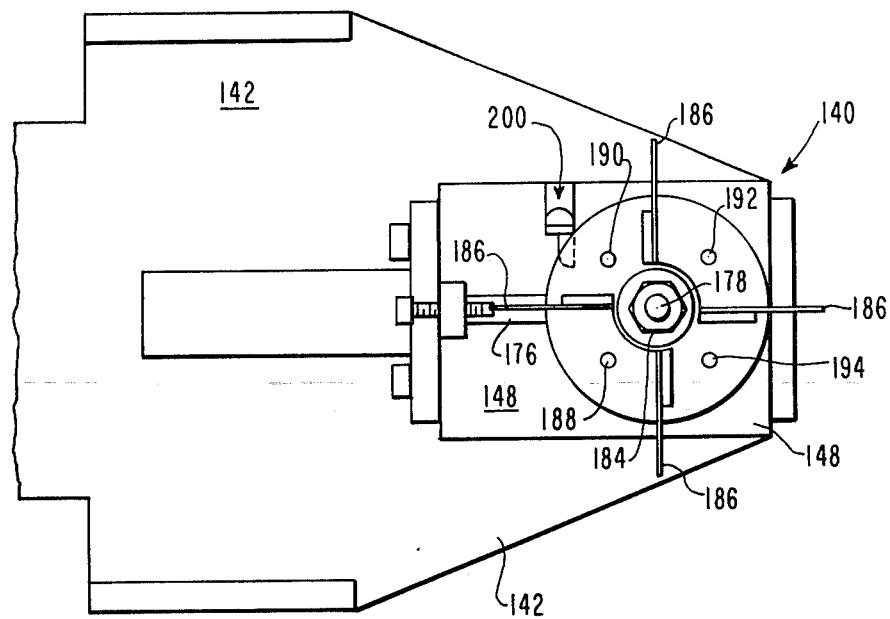
FIG. 14 is a top view of the gauging mechanism.
Figure 15:
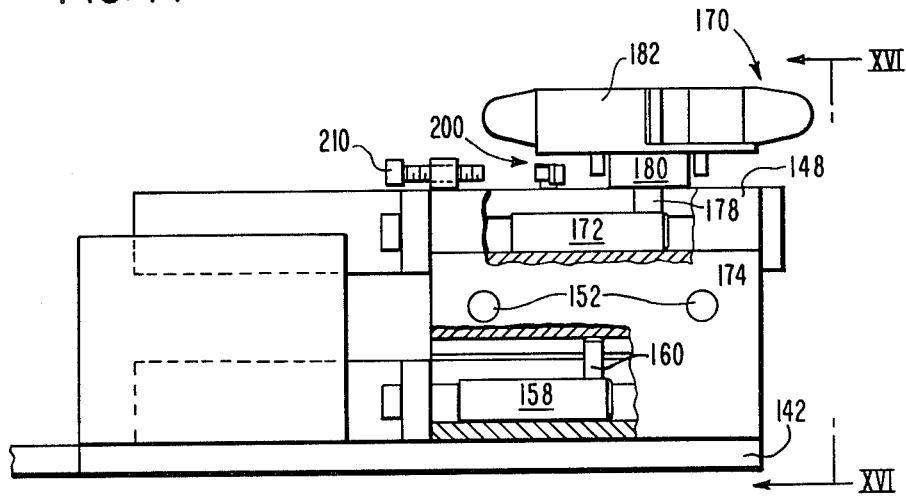
FIG. 15 is a partial cross-sectional view in elevation of the gauging mechanism.

Referring now to FIGS. 14, 15, 16 and 23-30, gauging mechanism 140 also comprises a gauge 170 rotatably mounted on platform 148. Gauge 170 comprises a substantially cylindrical rod 172 slidably disposed in a substantially cylindrical slot 174 of platform 148. Slot 174 extends the entire length of platform 148 and has a rectangular opening 176 along its top length. Rod 172 has a post 178 attached thereto and extending through opening 176. Rod 176 is attached to a push-pull type cable that extends to a location remote from reactor vessel 22 for moving rod 172 through slot 174. Gauge 170 also comprises a short cylindrical member 180 and a circular member 182 rotatably mounted on platform 148. Post 178 extends through a bore in cylinder member 180 and through circular member 182 and has a nut 184 attached to the top end thereof. Nut 184 prevents cylindrical member 180 and circular member 182 from being separated from post 178 but allows cylindrical member 180 and circular member 182 to rotate about post 178. Circular member 180 has a plurality of feeler gauges 186 attached thereto. Feeler gauges 186 may be thin metal strips ranging from 0.0015 inches to 1.050 inches in thickness for being disposed in gaps 34 to determine the width of the gaps between baffle plates 32. For example, circular member 180 may have four feeler gauges 186 disposed thereon at 90° to each other. In addition, a like number of pins 188, 190, 192 and 194 are attached to the underside of circular member 180 and arranged at approximately 90° to each other and equidistant between each feeler gauge as shown in FIG. 14. A spring loaded stop 200 is mounted on platform 148 and comprises a dog 202 rotatably disposed on pin 204 with a spring 206 disposed thereround. Dog 202 is arranged to rotate in one direction and is spring-loaded to return to its original position but is prevented from rotating in the opposite direction by post 208. A set screw 210 is mounted on platform 148 and arranged to contact cylindrical member 180 for limiting the travel of cylindrical member 180.

Figure 28:
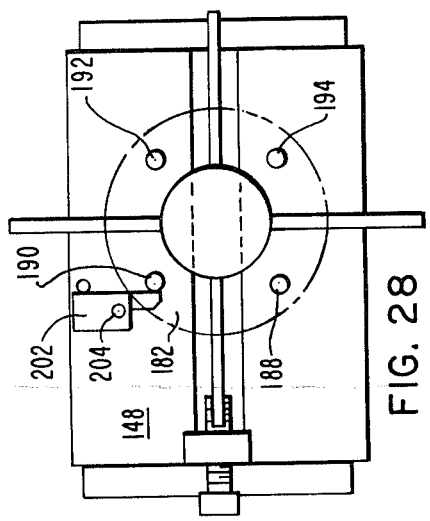
FIGS. 27–30 are top views of the gauging mechanism.
Figure 30:
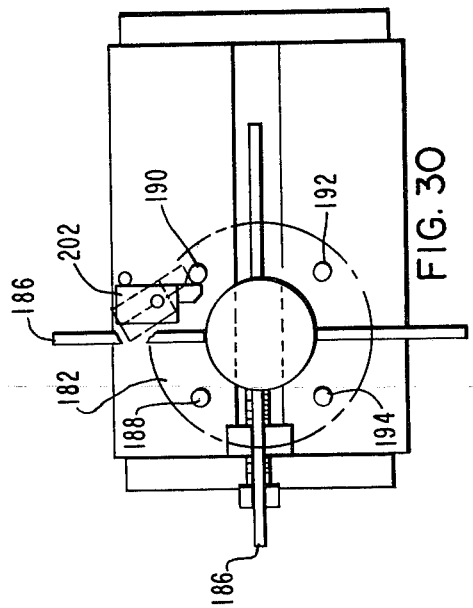
Figure 27:
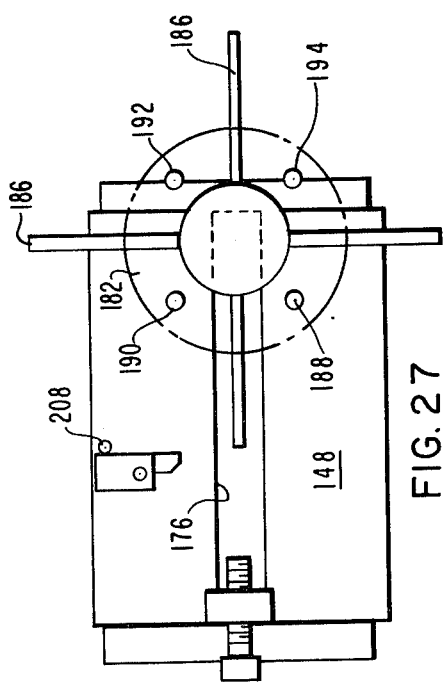
Figure 29:
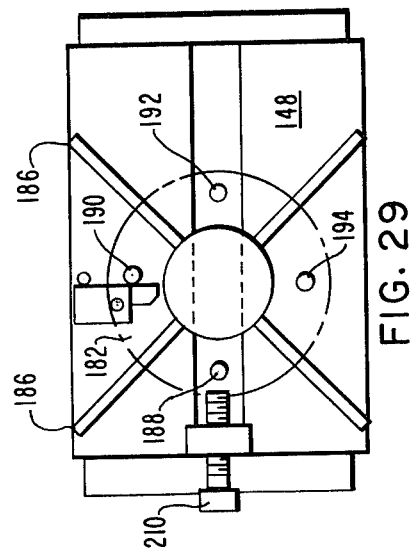
Figure 31:
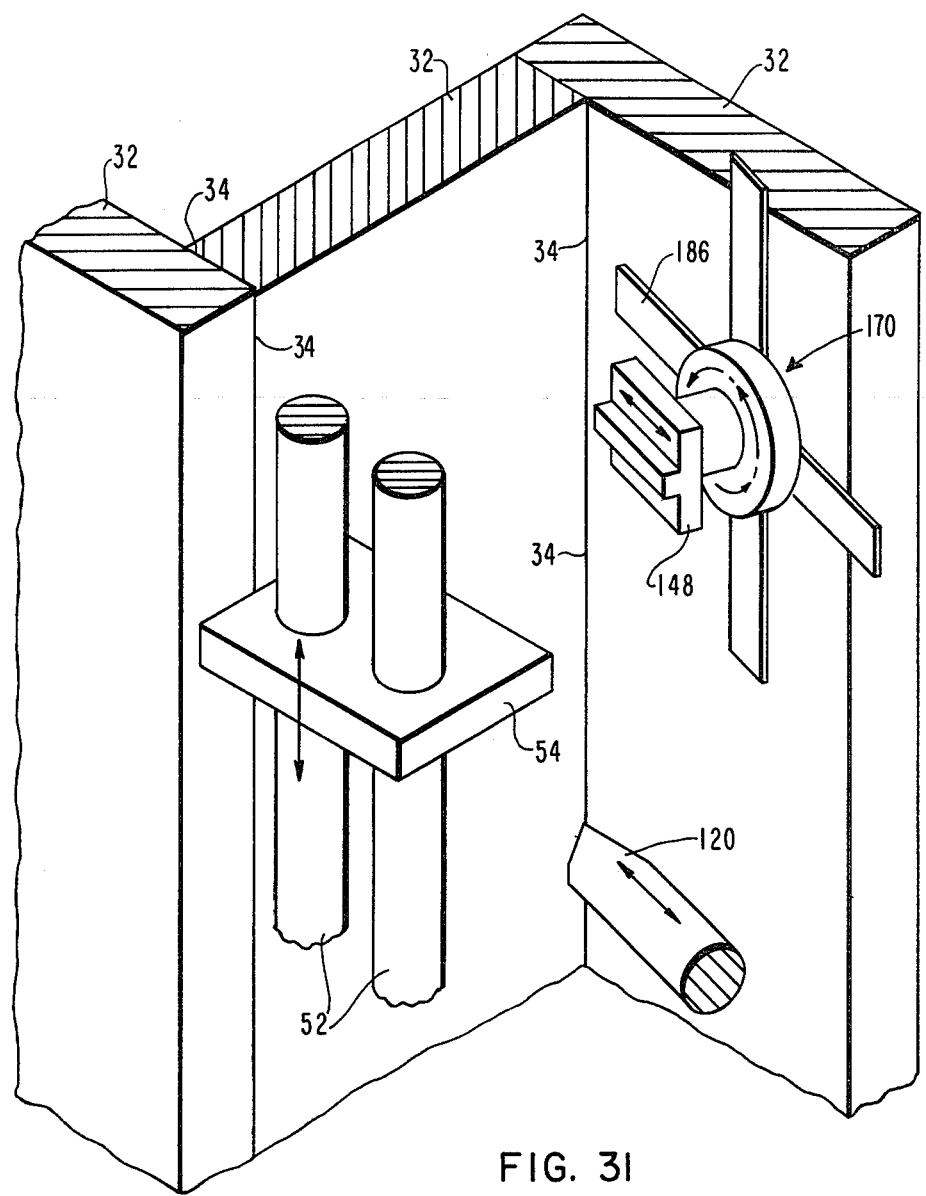
FIGS. 31 and 32 are schematic diagrams of the baffle maintenance apparatus.
Figure 32:
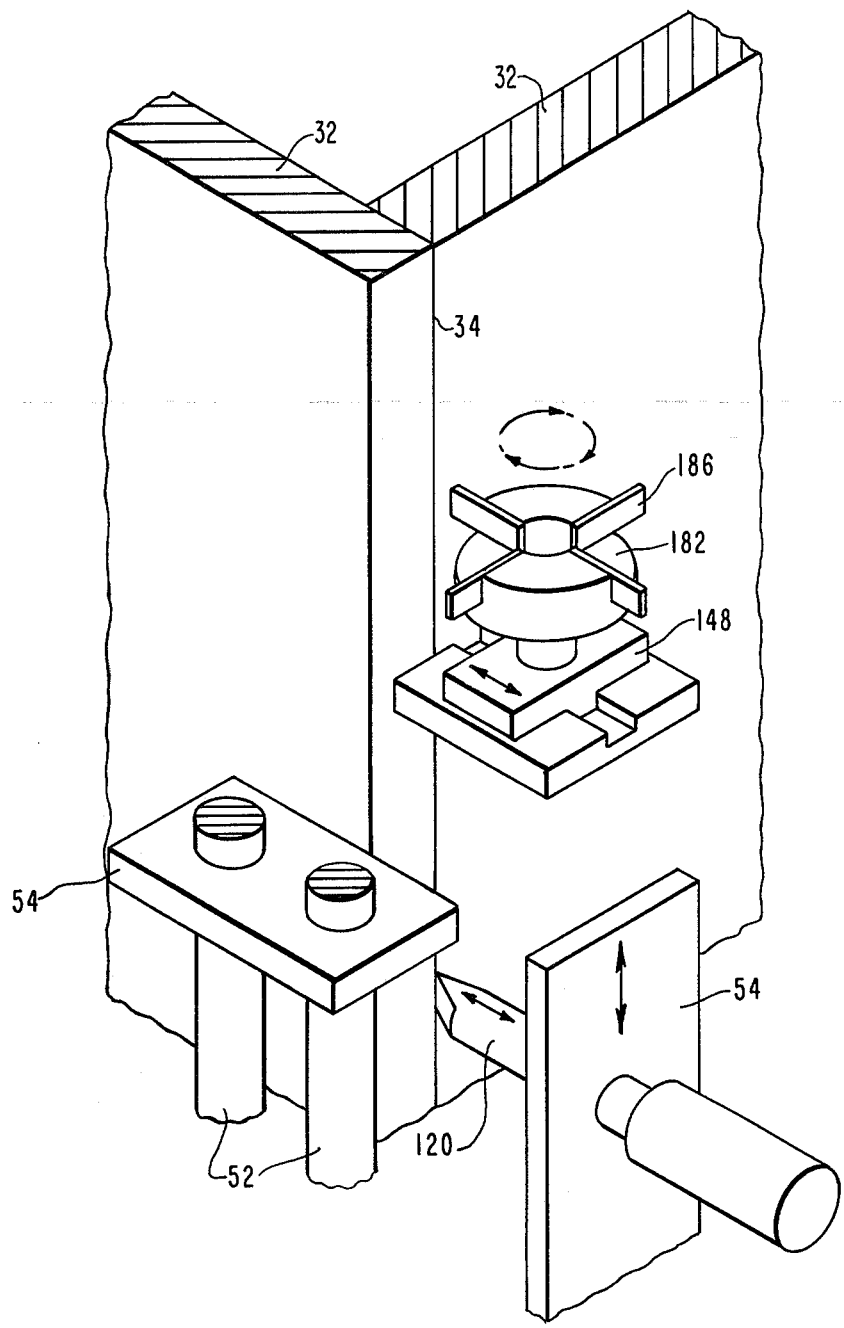

Referring now to FIGS. 27-30, in its initial position, gauge 170 is arranged to have a feeler gauge 186 substantially in alignment with opening 176 so as to be able to be inserted into a gap 34 between two baffle plates 32 as shown in FIG. 27. When rod 172 is pulled through slot 174 by cables, post 178 is moved trough opening 174 and toward set screw 210 until a pin such as pin 190 contacts dog 202 as shown in FIG. 28. Since post 208 prevents dog 202 from rotating in a clockwise motion as viewed in FIG. 28, pin 190 is prevented from moving toward set screw 210. However, because circular member 182 is rotatably mounted on post 178, as post 178 is moved closer to set screw 210, circular member 182 rotates in a clockwise direction as shown in FIG. 29. It can be seen in FIG. 29 that pin 190 slides along stop 202 as circular member 182 rotates. As post 178 is moved even closer to set screw 210, circular member 182 continues to rotate and completes a 90° rotation as circular member 182 contacts set screw 210 as shown in FIG. 30. At this point, rod 172 and post 178 may be pushed away from set screw 210 and into the original configuration of FIG. 27 except that circular member 182 will have been rotated 90°. Since dog 202 can rotate about pin 204 in a counterclockwise direction, dog 202 can rotate and allow a pin such as pin 188 to pass by as shown in phantom in FIG. 30. In this manner, by moving rod 172 through slot 174, a plurality of feeler gauges 186 can be rotated and extended into a gap 34 between two adjacent baffle plates 32 in order to measure the width of the space between the two baffle plates. It should be noted that platform 148 can be arranged to mount gauge 170 on the side thereof rather than on the top so as to rotate feeler gauges 186 in a vertical plane rather than in a horizontal plane as illustrated in FIG. 31.

OPERATION

When it is desired to measure gap 34 between two adjacent baffle plates 32, nuclear reactor 20 is shut down and all of the fuel assemblies are removed in a conventional manner. With reactor vessel 22 still filled with reactor coolant, baffle maintenance apparatus 40 is lowered into reactor vessel 22 by means of extension member 50. As baffle maintenance apparatus 40 is lowered into reactor vessel 22, pins 48 are inserted into flow holes in core plate 28 and guide members 74 are slid over the top ends of baffle plates 32. In this position, vertical support member 42 is aligned substantially vertically relative to baffle plates 32. Next, actuator shaft 134's drive mechanism which is located remote from reactor vessel 22 is activated which causes actuator shaft 134 to move upwardly relative to control valves 122-128. As actuator shaft 134 contacts wheel 132 of control valve 122, piston 130 is depressed which opens control valve 122 and activates gripper mechanism 66. Activation of gripper mechanism 66 causes latch 68 to engage the top of baffle plate 32 as shown in FIG. 6. At this point baffle maintenance apparatus is firmly positioned in reactor vessel 22.

Figure 9:
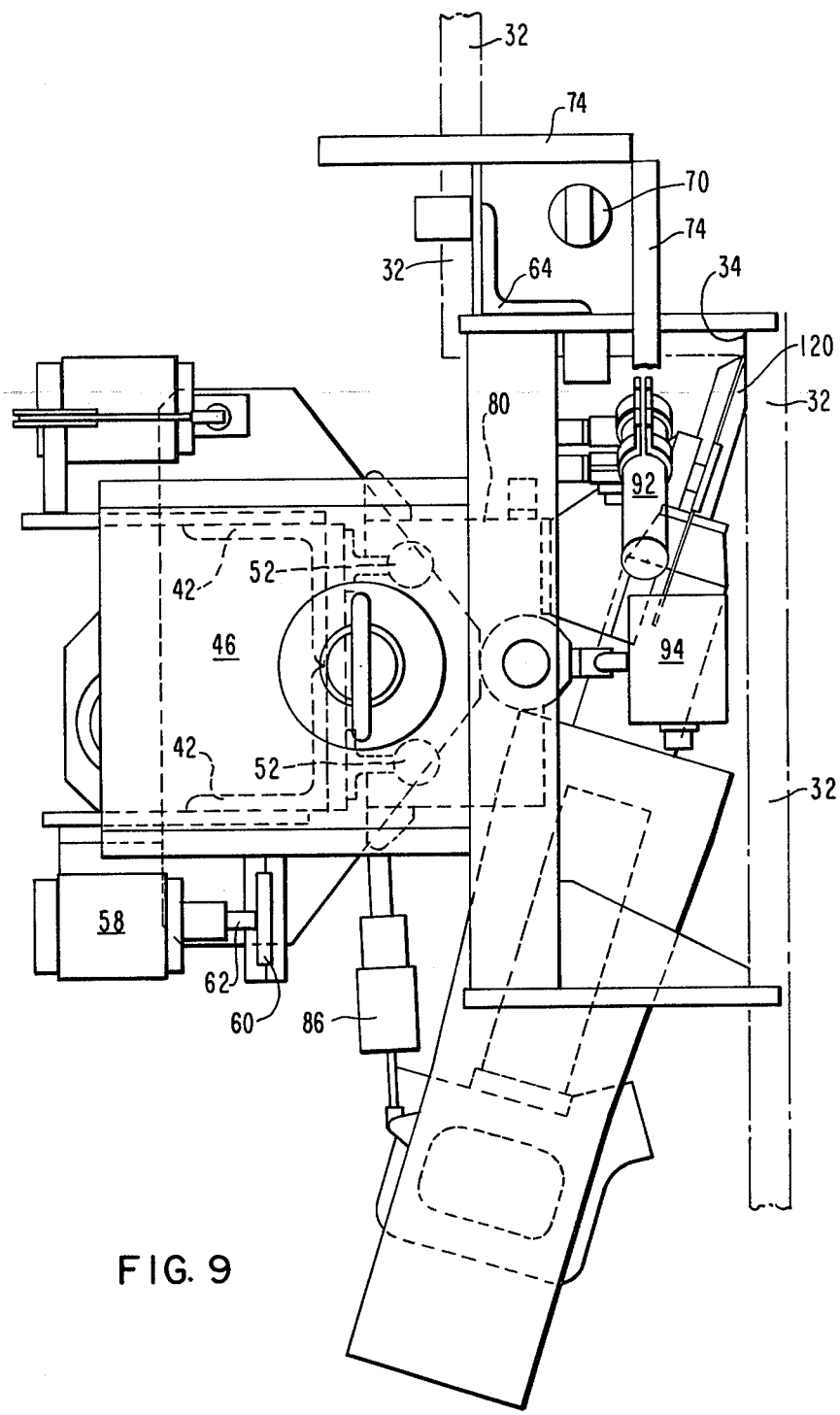
FIG. 9 is a view of the baffle maintenance apparatus as arranged in an inside corner of the baffle plates.
Figure 10:
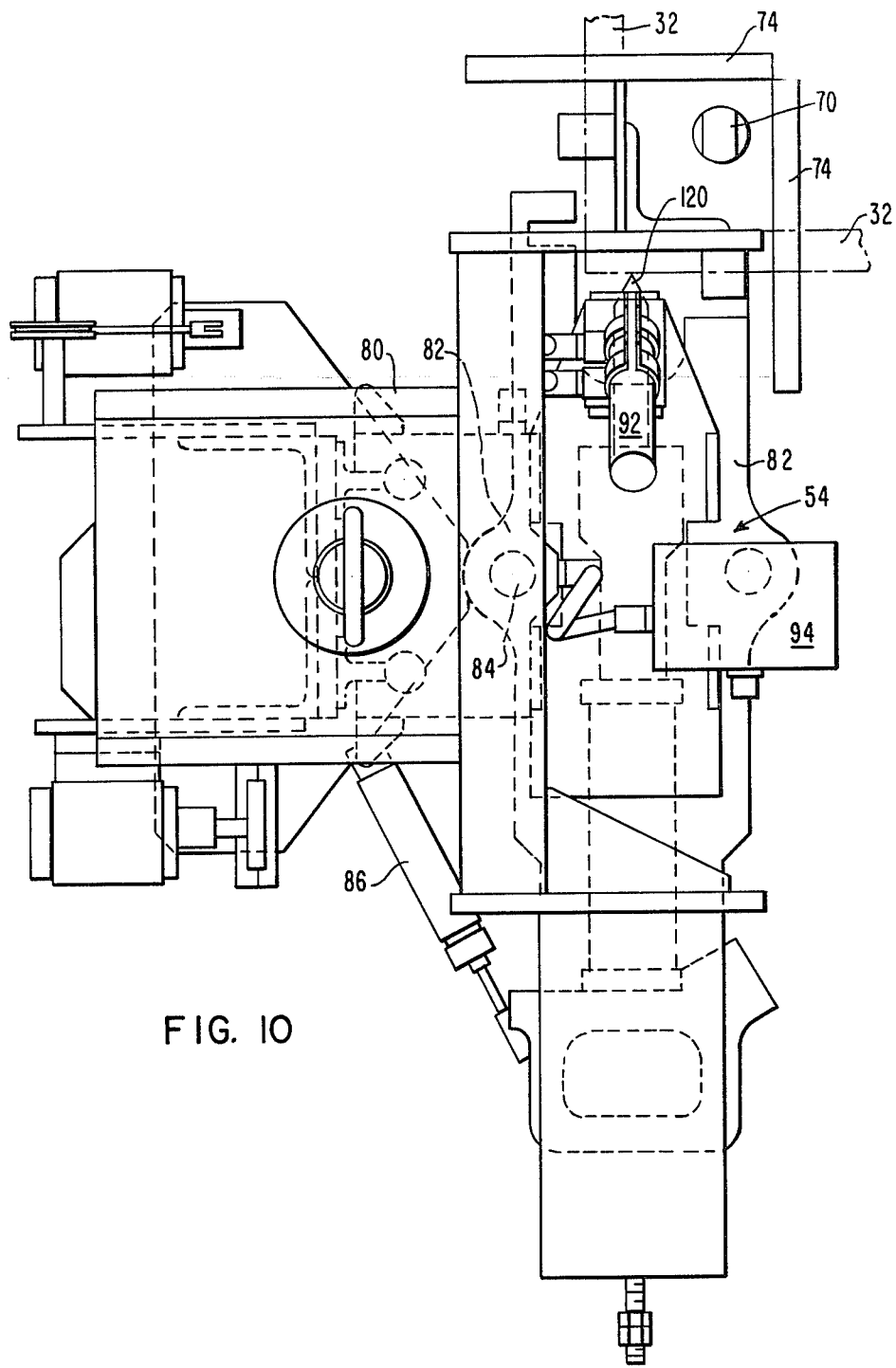
FIG. 10 is a view of the baffle maintenance apparatus as arranged on an outside corner of the baffle plates.
Figure 11:
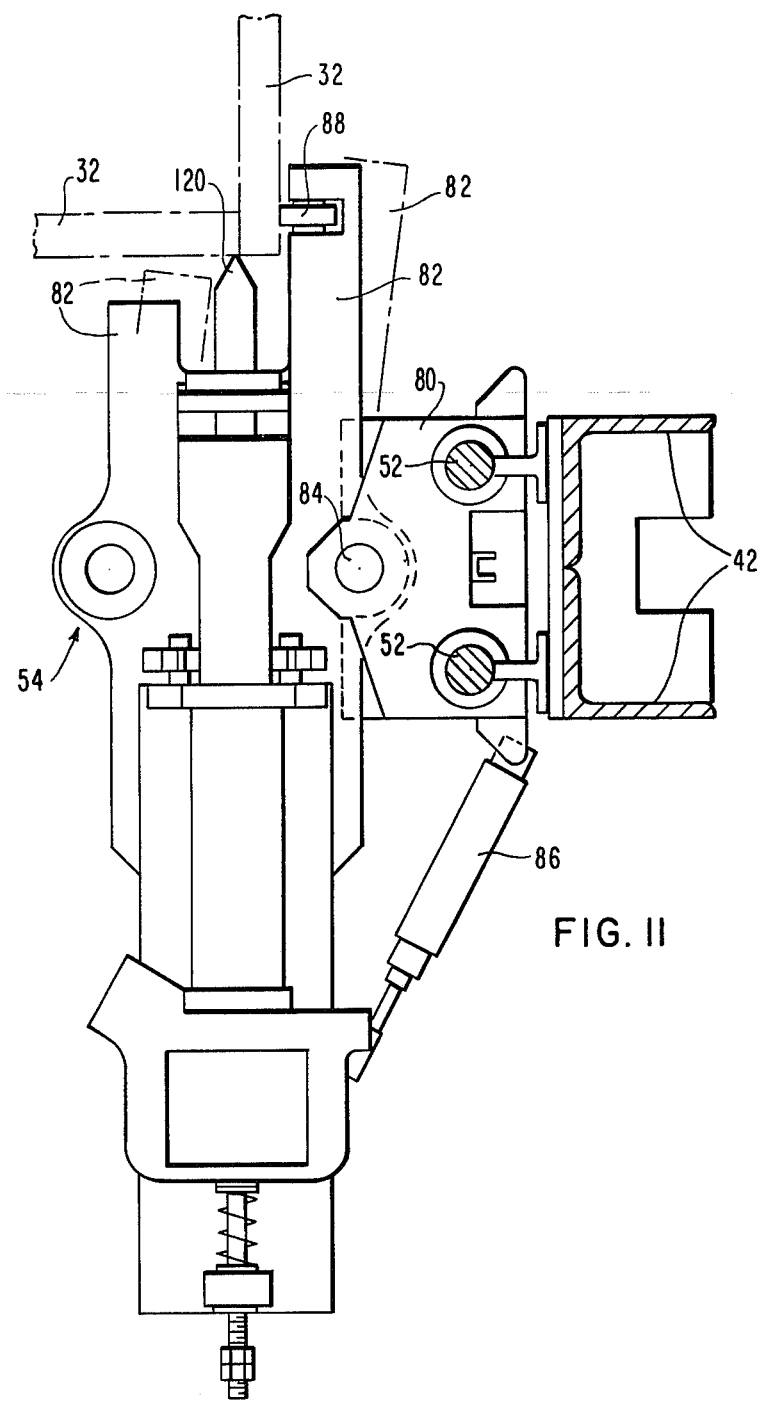
FIG. 11 is a partial top view of the carriage.

As actuator shaft 134 continues to move upwardly, control valve 124 is similarly activated which causes hydraulic cylinder 86 to pivot carriage plate 82 into a position as shown in FIGS. 9, 10 or 11 depending on the particular gap 34 that is to be inspected. The pivoting of carriage plate 82 moves carriage plate 82, for example, from a position as shown in phantom in FIG. 11 to the position as shown in full in FIG. 11. It should be understood from a review of the drawings and particularly FIG. 10, that wheel 88 can be mounted on either side of carriage plate 82 and that carriage plate 82 can be mounted in a reverse manner on mounting member 80 for accessing the various corners of baffle plates 32. With carriage plate 82 in this configuration, gap 34 may be either inspected with gauging mechanism 140 or gap 34 may be closed by activating peening apparatus 36. Also, with carriage plate 82 in this configuration, camera 92 and light source 94 are directed toward the particular gap 34 to be inspected so that working personnel located remote from reactor vessel 22 may view the work area.

Next, working personnel or automatic equipment may manipulate the cables connected to rod 172 for rotating a selected feeler gauge 186 (as previously described) into position for being inserted into the selected gap 34. Also, by moving rod 172, the selected feeler gauge 186 may be moved into a position as shown in FIG. 27 which will cause the feeler gauge to be inserted into the selected gap 34. In addition, cables may be manipulated to move rod 158 so as to laterally position the feeler gauge so that the feeler gauge may be inserted in gap 34. All of this may be performed in view of camera 92 so that the operating personnel may verify the movements. Similarly, additional feeler gauges 186 may be inserted into gap 34 so that operating personnel may determine the width of gap 34. If it is determined that gap 34 has a width greater than desired, actuator shaft 134 may again be moved so as to activate hydraulic hammer 96.

With hydraulic hammer 96 vibrating, actuator shaft 134 may then activate control valve 128 for moving table 98 and hydraulic hammer 96 toward the baffle plate 32 for closing the gap 34 between the baffle plates. When hydraulic hammer 96 contacts baffle plate 32, a portion of the edge of the baffle plate is deformed which causes gap 34 to be reduced as shown in FIG. 4. In this fashion, each gap 34 may be inspected and if necessary, the gap may be reduced to eliminate or greatly reduce the jetting of water through the gap when the reactor is operating.

In addition, drive means 56 may be employed in either the gauging or peening operation for moving carriage 54 including the gauging and peening apparatus along the length of each gap 34 so that the entire length of the gap may be inspected or reduced.

Of course, baffle maintenance apparatus 40 may be deactivated and removed from reactor vessel 22 in the reverse manner to which it was inserted.

Therefore, the invention provides apparatus for determining the size of a gap between two adjacent baffle plates in a nuclear reactor so that those gaps that are too large may be reduced.

I claim as my invention:
1. Baffle maintenance apparatus for inspecting baffle plates in a nuclear reactor comprising:
   a support member capable of being positioned in a nuclear reactor;
   a carriage slidably disposed on said support member;
   a platform disposed on said carriage;
   a rod slidably disposed in said platform;

a rotatable member rotatably disposed on said rod and having a plurality of feeler gauges attached thereto for selectively inserting said feeler gauges between said baffle plates for determining the width of the space between said baffle plates;

actuator means connected to said rod for moving said rod and said rotatable member relative to said platform; and indexing means mounted on said platform and arranged to contact said rotatable member when said rotatable member is moved relative to said platform for contacting and rotating said rotatable member relative to said platform.

2. The baffle maintenance apparatus according to claim 1 wherein said indexing means comprises a pivotable stop mounted on said platform and arranged to contact and rotate said rotatable member when said rotatable member is moved relative to said platform in a first direction and arranged to contact but not rotate said rotatable member when said rotatable member is moved relative to said platform in a direction opposite to said first direction.

3. The baffle maintenance apparatus according to claim 2 wherein said baffle maintenance apparatus further comprises:

a base fixedly mounted on said carriage and slidably connected to said platform; and positioning means connected to said base and to said platform for moving said platform relative to said base.

4. The baffle maintenance apparatus according to claim 3 wherein said positioning means comprises a second rod slidably disposed in a first slot in said base and slidably disposed in a second slot in said platform with said second slot being arranged in a plane different from the plane of said first slot whereby movement of said second rod in said first slot and in said second slot causes said platform to slide relative to said base.

5. The baffle maintenance apparatus according to claim 4 wherein said pivotable stop comprises:

a dog pivotally mounted on said platform and arranged to contact said rotatable member;

a post mounted on said platform and arranged to contact said dog and to prevent rotation of said dog in one direction; and biasing means attached to said dog and arranged to urge said dog into contact with said post.

6. The baffle maintenance apparatus according to claim 5 wherein said feeler gauges are mounted on said rotatable member in an equally spaced manner.

7. The baffle maintenance apparatus according to claim 6 wherein said rotatable member is a circular member and has said feeler gauges mounted thereon and spaced at equal distances around the circumference of said rotatable member.

8. The baffle maintenance apparatus according to claim 7 wherein said baffle maintenance apparatus further comprises drive means mounted on said support member and connected to said carriage for moving said carriage relative to said support member.

* * * * *